Aug. 23, 1938.  W. C. LANDIS  2,128,050
VENT OPENING PROTECTOR
Filed May 29, 1937

INVENTOR
WILLIAM C. LANDIS
BY Wm. M. Cady
ATTORNEY

Patented Aug. 23, 1938

2,128,050

UNITED STATES PATENT OFFICE 2,128,050

VENT OPENING PROTECTOR

William C. Landis, Wilmerding, Pa., assignor to The Westinghouse Air Brake Company, Wilmerding, Pa., a corporation of Pennsylvania Application May 29, 1937, Serial No. 145,554

13 Claims. (Cl. 303—1)

This invention relates to a vehicle fluid pressure equipment and particularly to a vent opening or vent passage protector adapted to be applied to the vent passage in a valve device to prevent the vent passage from being closed or partially restricted by dirt or foreign matter deposited therein by insects or otherwise.

In application Serial No. 78,423 of Clyde C. Farmer, filed May 7, 1936, there is shown one form of vent passage protector adapted to be employed with a brake controlling valve device. This protector employs a body formed of cast metal.

It is an object of this invention to provide an improved vent protector constructed of metal stampings in place of metal castings.

A further object of the invention is to provide an improved vent protector which can be constructed at small cost.

Another object of the invention is to provide an improved vent protector having great strength and resistance to breakage when struck.

A further object of the invention is to provide an improved vent protector.

Figure 1:
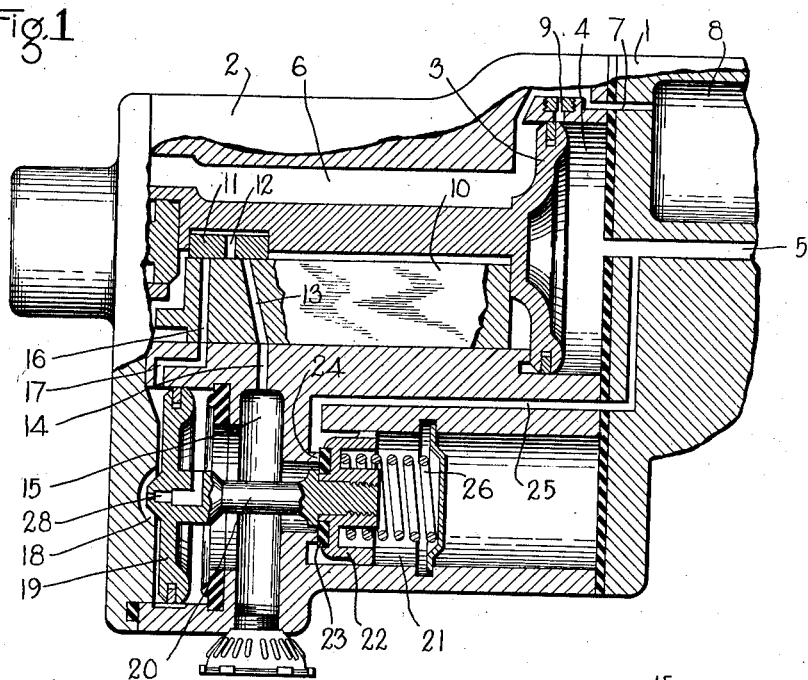
Figure 2:
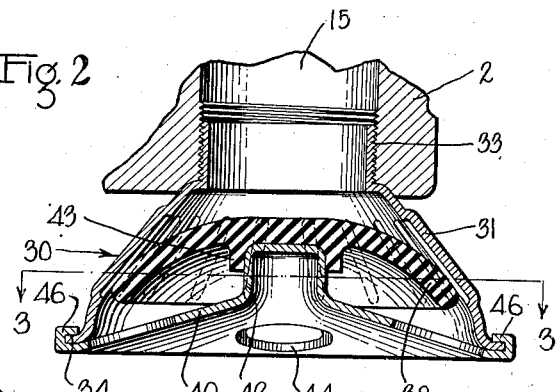
Figure 3:
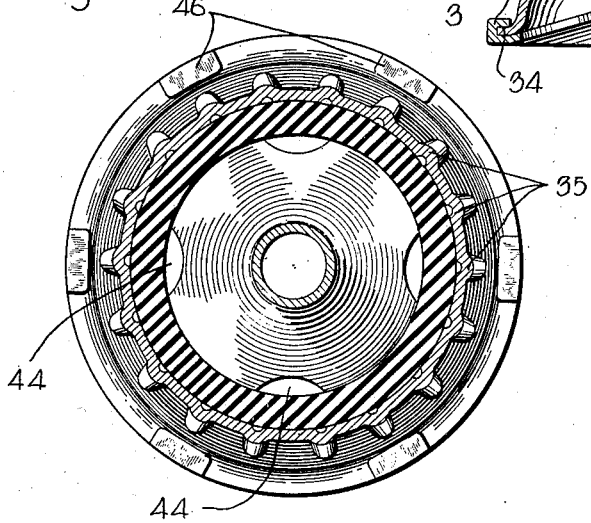

Other objects of the invention and features of novelty will be apparent from the following description taken in connection with the accompanying drawing, in which Fig. 1 is a sectional view of a portion of a brake controlling valve device equipped with the vent protector provided by this invention, Fig. 2 is an enlarged sectional view showing the vent protector provided by this invention, and Fig. 3 is a sectional view taken substantially along the line 3—3 on Fig. 2.

In Fig. 1 of the drawing there is illustrated a portion of a brake controlling valve device of the type with which the vent passage protector provided by this invention is adapted to be employed. The valve device shown in the drawing is of the type shown in U. S. Patent No. 2,031,213, issued February 18, 1936, to Clyde C. Farmer, and includes a pipe bracket section 1 and an emergency section 2.

The emergency section 2 comprises a body having a bore therein in which is mounted a piston 3, having at one side a chamber 4 connected by way of a passage 5 in the pipe bracket section 1 to the brake pipe, not shown. The piston 3 has at the other side a valve chamber 6, which is constantly connected by way of a passage 7 with a quick action chamber 8 formed in the pipe bracket section 1. The valve chamber 6 and the quick action chamber 8 are adapted to be charged with fluid under pressure supplied from the brake pipe through a restricted port 9 controlled by the piston 3.

A main slide valve 10 and an auxiliary slide valve 11 having movement relative to the main slide valve 10 are mounted in the valve chamber 6 and are operated by means of the piston 3.

In operation, the emergency piston 3 is adapted to respond to a service reduction in brake pipe pressure in the chamber 4, and moves the auxiliary slide valve 11 relative to the main slide valve 10 to a service position in which a port 12 through the auxilary slide valve 11 registers with a port 13 in the main slide valve 10, while in this position of the main slde valve 10, the port 13 registers with a port 14 which is open to an exhaust or vent passage 15 formed in the body of the emergency section 2 and having one end open to the atmosphere.

Upon movement of the auxiliary slide valve 11 to the service position, fluid under pressure is released from the valve chamber 6 and the quick action chamber 8 at a rate sufficient to reduce the pressure of the fluid in these chambers substantially as rapidly as the pressure of the fluid in the chamber 4 at the face of the piston 3 is reduced on a service reduction in brake pipe pressure to thereby prevent sufficient differential being developed between the pressures in the valve chamber 6, and in the brake pipe chamber 4, to cause the piston 3 to be moved to the emergency application position.

Upon an emergency reduction in brake pipe pressure in the piston chamber 4, the piston 3 operates to move the auxiliary slide valve 11 to an emergency position in which a port 16 through the main slide valve 10 is uncovered so that fluid under pressure from the valve chamber 6 flows through this port to a passage 17, which leads to a chamber 18 at one face of the vent valve piston 19, which is mounted in a bore in the body of the emergency section 2.

The piston 19 has a stem 20 formed integral therewith and extending across the vent passage 15 at a point spaced from the open end thereof. The stem 20 has secured on the end thereof a vent valve 22 carrying a sealing gasket 23 which is adapted to engage an annular seat rib 24 formed on the body of the emergency section 2 surrounding a passage open to the vent passage 15. The vent valve 22 is mounted in a chamber 21 which is constantly connected with the brake pipe branch passage 5 by way of a passage 25, while the vent valve 22 is yieldingly pressed against the seat rib 24 by means of a coil spring 26 in order to cut off communication between the chamber 21 and the vent passage 15.

On an increase in the pressure of the fluid in the chamber 18, force is exerted on the vent valve piston 19 to move it to the right, as viewed in the drawing, and this movement of the vent valve piston 19 is transmitted through the stem 20 to move the vent valve 22 against the spring 26 to release fluid under pressure at a rapid rate from the brake pipe branch passage 5 by way of the passage 25, the chamber 21, and the vent passage 15.

Fluid under pressure supplied to the chamber 18 at the face of the vent valve piston 19 is gradually released therefrom through a restricted passage 28 through the vent valve piston 19, and on a reduction in the pressure of the fluid in the chamber 18 to a predetermined relatively low value, the force exerted thereby on the piston 19 is insufficient to hold the vent valve 22 against the spring 26, and the vent valve 22 is thereupon moved into engagement with the seat rib 24 to cut off communication between the brake pipe and the atmosphere through the vent passage 15.

If foreign material, such as mud, is deposited in the vent passage 15 by insects such as wasps or the like, this material may prevent movement of the vent valve piston 19, or the vent valve, or it may prevent the venting of the fluid from the valve chamber 6 through the passage 14 on a service reduction on brake pipe pressure. Similarly, it may prevent venting of fluid from the chamber 18 through the passage 28, thereby interfering with the intended operation of the valve device. The vent passage protector provided by this invention operates to prevent the entrance of insects, such as wasps or the like, into the vent passage, and to thereby prevent the deposit of mud or other material in this passage, while the vent passage protector is arranged to permit the free flow of fluid under pressure from the vent passage 15 to the atmosphere.

The vent passage protector provided by this invention comprises a funnel-shaped body, indicated generally by the reference numeral 30, formed as a stamping from suitable sheet metal. This body includes a conical portion 31, and has at the smaller end of the conical portion, a substantially tubular portion 33 having threads formed therein and adapted to be received by complementary threads formed in the body of the emergency section 2 surrounding the end of the vent passage 15.

The body 30 also has a substantially radially extending flange 34 formed integral therewith and surrounding the larger end of the conical portion 31.

The conical portion 31 has a plurality of ribs, indicated at 35, formed therein and providing grooves in the inner face of the conical portion 31. The ribs 35 are spaced apart circumferentially of the conical portion 31, as is clearly shown in Fig. 3 of the drawing.

The vent protector provided by this invention includes a resilient element 38 which may be formed of any suitable material, such as molded rubber composition. The element 38 has a substantially curved outer surface and is substantially circular in outline. The peripheral portion of the element 38 is adapted to engage the inner face of the conical portion 31 of the body 30, and when the element 38 is in position, the grooves provided by the ribs 35 form passages communicating with the regions on the opposite sides of the element 38.

The vent protector provided by this invention includes a securing member, indicated generally by the reference numeral 40, for maintaining the element 38 in position. The securing member 40 is formed as a sheet metal stamping and includes a centrally disposed boss or projection 42 which extends into a recess in the face of the element 38 which is surroundeded by a rib 43.

The member 40 has a plurality of openings 44 therein to permit communication from the region at the lower face of the element 38 to the atmosphere, while the peripheral portion of the member 40 has circumferentially spaced tongues, indicated at 46, formed integral therewith and adapted to be bent over the flange 34 on the body 30 to secure the member 40 to the body 30.

When the member 40 is in position, it presses the peripheral portion of the member 38 against the inner face of the conical portion 31 of the body 30, while the projection 42 on the member 40 cooperates with the recess in the face of the element 38 to maintain the element 38 in the proper position with respect to the body 30.

The grooves provided by the ribs 35 permit fluid released to the vent passage 15 to flow past the periphery of the element 38, and thence through the openings 44 in the member 40 to the atmosphere. When fluid under pressure is supplied to the vent passage 15 at a rapid rate, as occurs when the vent valve 22 is unseated during an emergency application of the brakes, the pressure of the fluid in the vent passage 15 operating upon the resilient element 38 causes the peripheral portion of this element to be moved away from the inner face of the body 30 to thereby provide a large passage through which fluid under pressure may escape to the atmosphere.

On the subsequent reduction in the pressure of the fluid in the vent passage 15, the peripheral portion of the element 38 is returned into engagement with the inner face of the conical portion 31 of the body 30, and thus preventing the access of insects or the like to the vent passage 15 past the element 38.

It will be seen that the metal parts of the vent protector provided by this invention are constructed as stampings from sheet metal, and accordingly they can be produced at small cost, while they possess great strength and will not break in service.

It will be seen also that the device provided by this invention is simple in design with the result that it is easy to construct and assemble, while the device is so arranged that it will not become inoperative in service or interfere with operation of the valve device with which it is associated.

While one embodiment of the improved vent opening protector provided by this invention has been illustrated and described in detail, it should be understood that the invention is not limited to these details of construction, and that numerous changes and modifications may be made without departing from the scope of the following claims.

Having now described my invention what I claim as new and desire to secure by Letters Patent, is:

1. In a vent protector for the exhaust passage of a fluid pressure brake device or the like, a generally funnel-shaped body provided with a substantially conical portion having at the smaller end thereof a generally tubular portion, a substantially circular element formed of resilient material mounted in said conical portion, and a securing member extending across the open end of the conical portion for maintaining said element in position with the peripheral portion thereof engaging the inner face of said conical portion, a face of said element having a recess therein substantially centrally thereof, said member having a projection substantially centrally thereof extending into said recess.

2. In a vent protector for the exhaust passage of a fluid pressure brake device or the like, a generally funnel-shaped body provided with a substantially conical portion having at the smaller end thereof a generally tubular portion, a substantially circular element formed of resilient material mounted in said conical portion, and a securing member extending across the open end of the conical portion for maintaining said element in position with the peripheral portion thereof engaging the inner face of said conical portion, a face of said element having a recess therein substantially centrally thereof, said member having a projection substantially centrally thereof extending into said recess, the portion of the inner face of said conical portion engaged by said element having a plurality of axially extending grooves therein connecting the region at one side of said element and the region at the other side thereof.

3. In a vent protector for the exhaust passage of a fluid pressure brake device or the like, a generally funnel-shaped body including a substantially conical portion and having at the smaller end thereof a substantially tubular portion, a substantially circular element formed of resilient material having a curved external surface adapted to engage the inner face of the conical portion, and a securing member extending across the open end of said conical portion, said securing member cooperating with said element to press the peripheral portion of said element against the inner face of said conical body portion.

4. In a vent protector for the exhaust passage of a fluid pressure brake device or the like, a sheet metal stamping comprising a generally funnel-shaped body including a substantially conical portion and having at the smaller end thereof a substantially tubular portion, a substantially circular element formed of resilient material and having a curved surface adapted to engage the inner face of said conical portion, and a securing member comprising a sheet metal stamping extending across the open end of said conical body portion, said member cooperating with said element to press the peripheral portion of said element against the inner face of said conical body portion.

5. In a vent protector for the exhaust passage of a fluid pressure brake device or the like, a generally funnel-shaped body provided with a substantially conical portion having at the smaller end thereof a generally tubular portion, a substantially circular element formed of resilient material mounted in said conical portion and having the peripheral portion engaging the inner face of said conical portion, and a securing member for maintaining said element in position, the central portions of said element and of said securing member having cooperating projection and recess means formed thereon, said securing member extending across the larger end of the conical portion of said body and having its peripheral portion secured to said body.

6. In a vent protector for the exhaust passage of a fluid pressure brake device or the like, a generally funnel-shaped body provided with a substantially conical portion having at the smaller end thereof a generally tubular portion, a substantially circular element formed of resilient material mounted in said conical portion and having its peripheral portion engaging the inner face of said conical portion, the portion of the inner face of said conical portion engaged by said element having a plurality of axially extending grooves therein connecting the region at one side of said element with the region at the other side thereof, and a securing member for maintaining said element in position, the central portion of said element and of said securing member having cooperating projection and recess means formed thereon, said securing member extending across the larger end of said conical portion of said body and having its peripheral portion secured to said body.

7. In a vent protector for the exhaust passage of a fluid pressure brake device or the like, a generally funnel-shaped body provided with a substantially conical portion having at the smaller end thereof a generally tubular portion, said body having a generally radially extending flange surrounding the larger end of said conical portion, a substantially circular element mounted in said conical portion and having its peripheral portion engaging the inner face of said conical portion, and a securing member for maintaining said element in position, the central portions of said element and securing member having cooperating projection and recess means, the securing member extending across the larger end of the conical portion of said body and having its peripheral portion bent over the flange on said body.

8. In a vent protector for the exhaust passage of a fluid pressure brake device or the like, a generally funnel-shaped body provided with a substantially conical portion having at the smaller end thereof a generally tubular portion, said body having a substantially radially extending flange surrounding the larger end of said conical portion, a member extending across said conical portion and having its peripheral portion bent over the flange on said body, and a substantially circular resilient element mounted between said member and said body, the central portion of said element being engaged by said member.

9. In a vent protector for the exhaust passage of a fluid pressure brake device or the like, a generally funnel-shaped body provided with a substantially conical portion having at the smaller end thereof a generally tubular portion, said body having a substantially radially extending flange surrounding the larger end of said conical portion, a member extending across said conical portion and having its peripheral portion bent over the flange on said body, and a substantially circular resilient element mounted between said member and said body, the central portion of said element and said member having cooperating projection and recess means formed thereon, the central portion of said member engaging the central portion of said element to press said element against the inner face of said conical body portion.

10. In a vent protector for the exhaust passage of a fluid pressure brake device or the like, a metal stamping having a generally conical portion having at the smaller end thereof a generally tubular portion, said stamping having a radially extending flange surrounding the larger end of said conical portion, a member extending across the larger end of said conical portion and having its peripheral portion bent over said flange to secure said member in position, and a substantially circular resilient element mounted between said member and said stamping, the peripheral portion of said element engaging the inner surface of the conical portion of the stamping, the central portion of said element being engaged by said member.

11. In a vent protector for the exhaust passage of a fluid pressure brake device or the like, a sheet metal stamping comprising a generally funnel-shaped body including a substantially conical portion having at the smaller end thereof a substantially tubular portion, a substantially circular element formed of resilient material mounted in said conical body with its peripheral portion engaging the inner face of said conical body, and a stamped metal member for securing said element in position, said member extending across the larger end of said conical body portion and having its peripheral portion secured to said body portion.

12. In a vent protector for the exhaust passage of a fluid pressure brake device or the like, a sheet metal stamping comprising a generally funnel-shaped body including a substantially conical portion having at the smaller end thereof a substantially tubular portion, a substantially circular element formed of resilient material mounted in said conical body with its peripheral portion engaging the inner face of said conical body, and a stamped metal member for securing said element in position, said member extending across the larger end of said conical body portion and having its peripheral portion secured to said body portion, said element and said member having cooperating projecting and recess means formed thereon.

13. In a vent protector for the exhaust passage of a fluid pressure brake device or the like, a body having a chamber therein open at one end to said exhaust passage and at the other end to the atmosphere, means for securing said body to said device, a flexible element mounted in said chamber and engaging the inner wall thereof, and a securing member secured to said body at the outer edge of said element and engaging said flexible element to press said element into engagement with said chamber wall.

WILLIAM C. LANDIS.